US007766533B2

(12) United States Patent
Liu et al.

(10) Patent No.: US 7,766,533 B2
(45) Date of Patent: Aug. 3, 2010

(54) ILLUMINATION MODULE, AND A DISPLAY AND GENERAL LIGHTING APPARATUS USING THE SAME

(75) Inventors: Ying Liu, New Territories (HK); Pak-Hong Ng, Kowloon (HK); Shou-Lung Chen, New Territories (HK)

(73) Assignee: Hong Kong Applied Science and Technology Research Institute Co., Ltd., Shatin, New Territories (HK)

( * ) Notice: Subject to any disclaimer, the term of this patent is extended or adjusted under 35 U.S.C. 154(b) by 84 days.

(21) Appl. No.: 12/290,340

(22) Filed: Oct. 28, 2008

(65) Prior Publication Data

US 2009/0273946 A1 Nov. 5, 2009

(30) Foreign Application Priority Data

Feb. 5, 2008 (CN) .......................... 2008 1 0006292

(51) Int. Cl.
*F21V 7/04* (2006.01)
(52) U.S. Cl. .................. 362/616; 362/27; 362/613; 362/97.1; 362/561; 362/623; 349/65
(58) Field of Classification Search .................. 362/27, 362/97.1, 97.2, 97.3, 561, 607, 612, 613, 362/616, 623; 349/65
See application file for complete search history.

(56) References Cited

U.S. PATENT DOCUMENTS

| 7,543,972 B2* | 6/2009 | Huang et al. ................. 362/616 |
| 7,661,862 B2* | 2/2010 | Lee et al. .................... 362/97.1 |
| 2008/0130314 A1* | 6/2008 | Liu et al. .................... 362/616 |
| 2009/0073720 A1* | 3/2009 | Feng et al. .................. 362/616 |

* cited by examiner

*Primary Examiner*—Stephen F Husar
(74) *Attorney, Agent, or Firm*—Berkeley Law & Technology Group, LLP

(57) ABSTRACT

The present invention provides an illumination module, and a display and a general lighting apparatus using the same. Said illumination module includes a plurality of light guiding strips arranged in juxtaposition with a predefined distance; a plurality of light sources, disposed on at least one end of said light guiding strips respectively for providing the light into said light guiding strips; and a plurality of light reflecting units, disposed between said light guiding strips for reflecting the light from said light guiding strips. The light reflecting units according to the present invention can guide the light from the sides of light guiding strips or other light not toward the right side of the illumination module back to the right side of the illumination module, and thus improving the light output efficiency and uniformity.

18 Claims, 5 Drawing Sheets

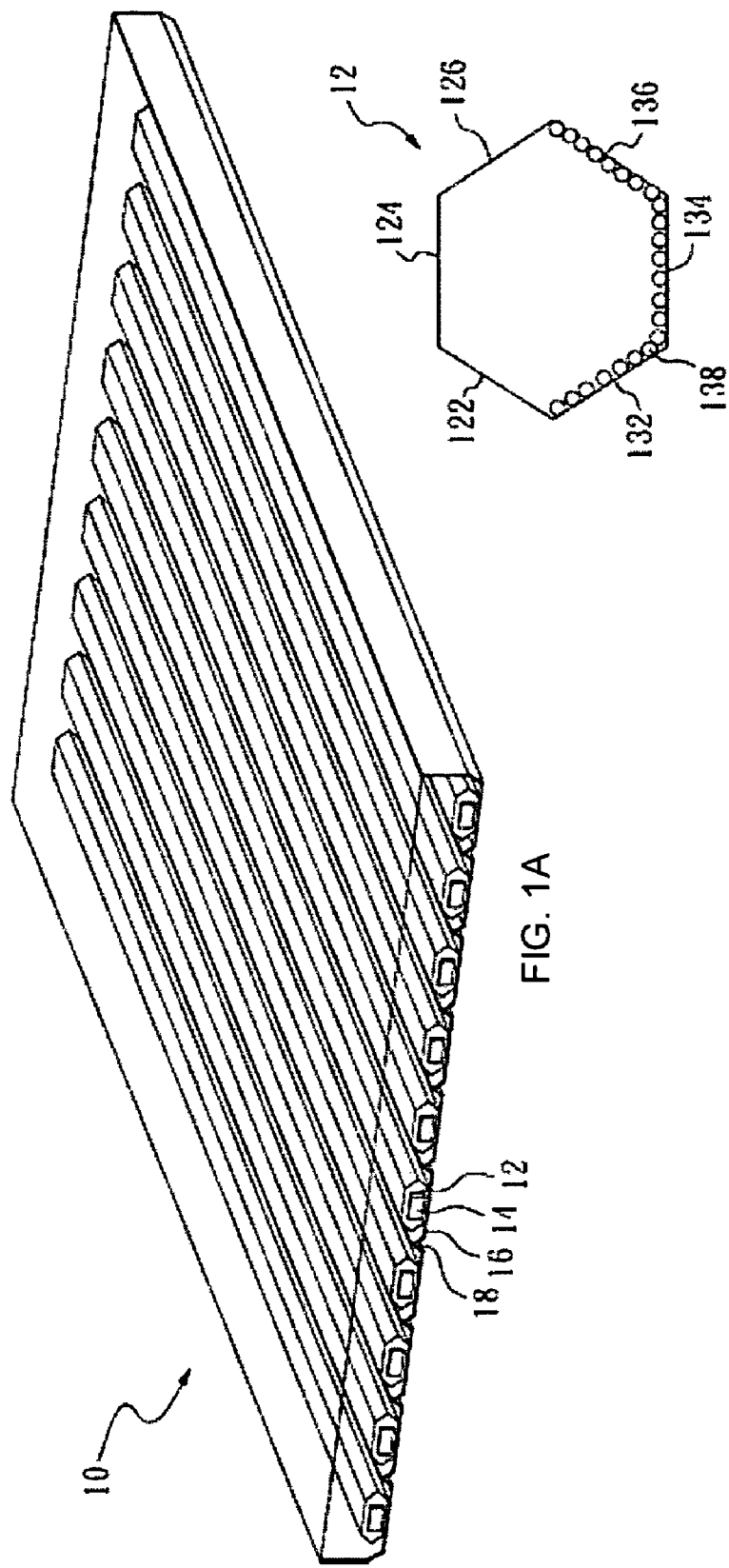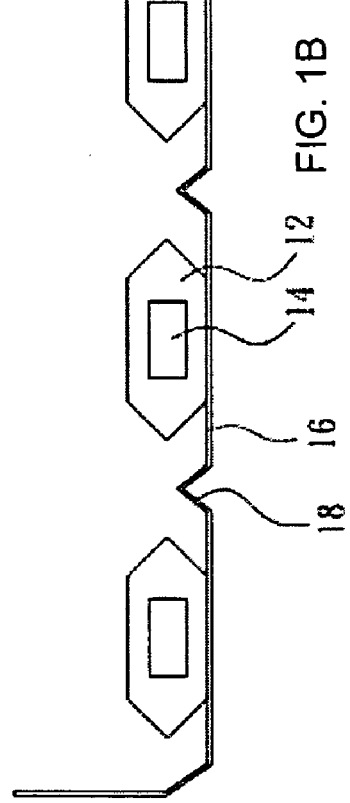
FIG. 1A
FIG. 1B
FIG. 1C

ILLUMINATION MODULE, AND A DISPLAY AND GENERAL LIGHTING APPARATUS USING THE SAME

FIELD OF THE INVENTION

The present invention relates to an illumination module, and more particularly to an illumination module in which the light reflecting units are disposed between the light guiding strips of an illumination module.

BACKGROUND INFORMATION

Backlight illumination modules of the Liquid crystal display (LCD) is one of specific applications of illumination modules, and also one of basic components of LCD. Currently, many types of backlight illumination modules are used in practice. For example, in a conventional side-lit backlight illumination module, light emitting diodes (LEDs) are disposed on both sides of the backlight illumination module, and a light guide is provided in the display area of the LCD display, and thus the light emitted by the LEDs at two ends of the backlight illumination module can be uniformly irradiated out of the backlight illumination module via the light guide. In a direct-lit backlight illumination module, a plurality of LEDs is provided in the display area of the LCD display directly, so the light guide is not required. However, the half-power angle of the radiation of each LED is about 120°. Therefore, in a direct-lit backlight illumination module, a distance must be reserved above the LEDs so as to allow the light emitted by two neighboring LEDs to be partially overlapping. The two types of backlight illumination modules mentioned above have their advantages and disadvantages respectively. The side-lit backlight illumination module employing the light guide is usually heavier than the direct-lit backlight illumination module; however, the LEDs in the side-lit backlight illumination module are arranged less densely than those in the direct-lit backlight illumination module. Since the direct-lit backlight illumination module requires a long light-mixing distance, it is relatively thick; on the other hand, the direct-lit backlight illumination module also requires an additional circuit board. Therefore, the cost of the overall structure of the direct-lit backlight illumination module is higher. The illumination module not only can be used in LCD, but also can be used in planar light source for the general illumination because of the similar principle. Therefore only the examples of illumination module used in a LED display are provided herein.

Illumination modules with increased LED pitch are provided in US Patent Publication Nos. 2005/0007758A1, 2005/0140848A1 and U.S. Pat. No. 6,966,644. Firstly, US Patent Publication No. 2005/0007758A1 provides a strip-shaped light guide with a plurality of openings, and an LED is disposed at two ends of the light guiding strip respectively. When the LEDs emit light, a plurality of openings of the light guide will radiate light to simulate a plurality of LEDs. Further, US Patent Publication No. 2005/0140548A1 provides an illumination module with a plurality of strip-shaped light guides, which is advantageous in that the brightness of the illumination module can be adjusted by individually driving the selected light guide. Moreover, U.S. Pat. No. 6,966,664 provides a light guiding strip, in which the light emitted by LEDs at two ends of the light guiding strip is concentratedly irradiated out from a arced surface of the light guiding strip, so as to form a linear and uniform light source.

In view of the above, light guiding strips in the art and the backlight illumination module and display using the light guiding strip have the shortcomings of being thick and heavy or having a high cost, so it is necessary to provide a light, thin, and low-cost light guiding strip and an illumination module and display using the light guiding strip.

SUMMARY OF THE INVENTION

In order to solve the problems that the conventional illumination module and display using the same are thick and heavy or have a high cost, the present invention provides an illumination module that possesses both side-lit and direct-lit characteristics, and a display and general lighting apparatus using the same, so as to achieve the advantages of light weight, large LED pitch, low cost and light output uniformity.

One embodiment of the present invention provides an illumination module. Said illumination module comprises a plurality of light guiding strips arranged in juxtaposition with a predefined distance therein; a plurality of light sources, disposed on at least one end of each of said light guiding strips for providing the light into said light guiding strips; and a plurality of light reflecting units disposed between said light guiding strips for reflecting the light from said light guiding strips.

According to one preferred embodiment of the present invention, said light reflecting unit is long strip-shaped, disposed substantially parallel to said light guiding strips. Preferably, a cross section of said light reflecting units includes at least one of triangle, arclike and a plurality of arcs.

According to another preferred embodiment of the present invention, a plurality of granular light reflecting units are disposed between each two neighboring ones of said light guiding strips. Preferably, a cross section of said light reflecting units include at least one of conical shape, triangle pyramid and hemispherical.

The light reflecting units according to the present invention can guide the light from the side edges of the light guiding strips or other light not toward the right side of the illumination module back to the right side of the illumination module, and thus improving the light output efficiency and uniformity.

Other objectives and advantages of the present invention will be apparent and the present invention will be fully understood according to the following description of the present invention and the appended claims with reference to the accompanying drawings.

BRIEF DESCRIPTION OF THE DRAWINGS

FIG. 1A is a schematic view of an illumination module according to one embodiment of the present invention;

FIG. 1B shows a cross sectional view of the illumination module illustrated in FIG. 1A;

FIG. 1C shows a cross sectional view of the light guiding strip illustrated in FIG. 1A;

DETAILED DESCRIPTION OF THE EXEMPLARY EMBODIMENTS

Figure 2A:
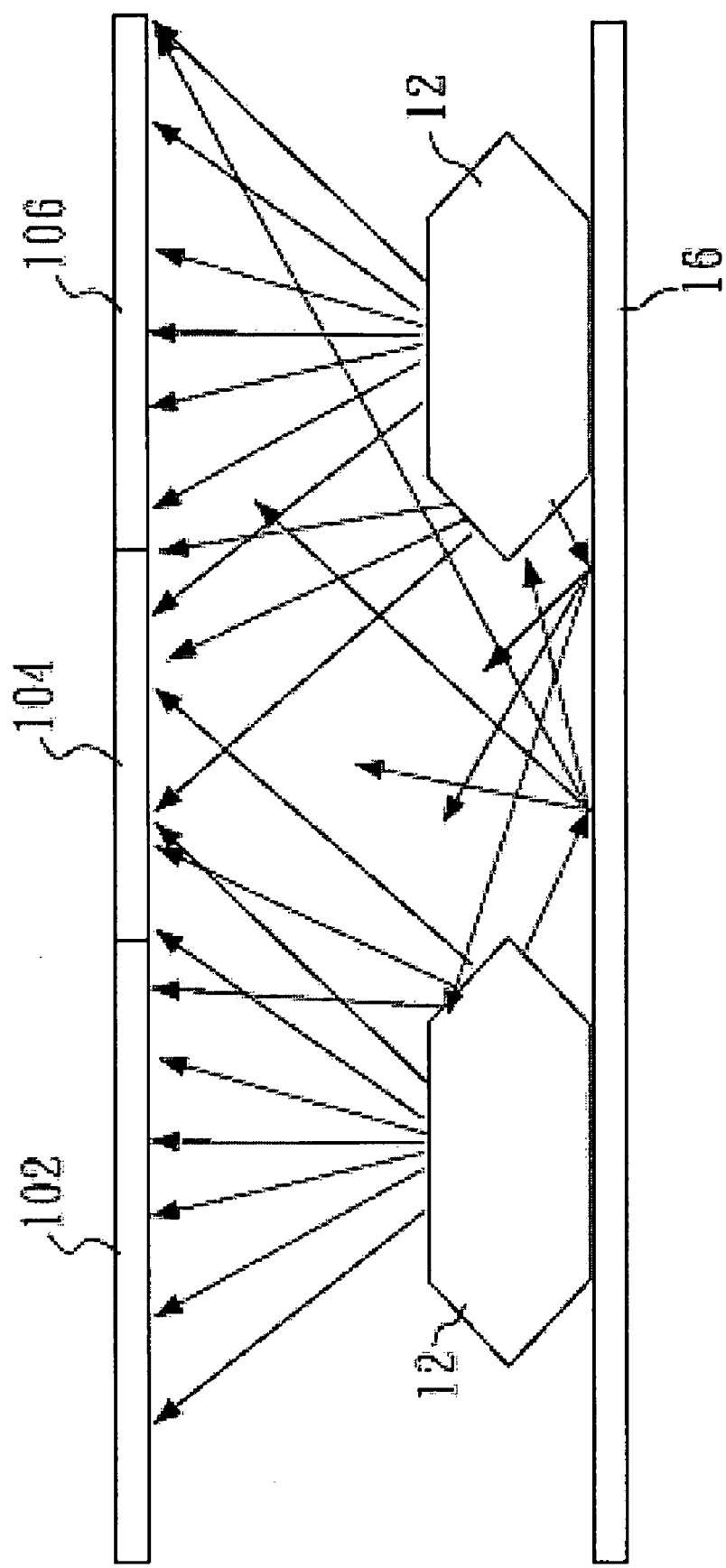
FIG. 2A is a schematic view of the light output of an illumination module without the light reflecting units.

The present invention provides an illumination module 10 that possesses both the side-lit and the direct-lit characteristics. FIG. 1A and FIG. 1B are a schematic view and a side view of such an illumination module, respectively, according to one embodiment of the invention. As shown in FIG. 1A and FIG. 1B, the illumination module 10 includes a plurality of light guiding strips 12 arranged in juxtaposition with a predefined distance, and a LED 14 is disposed on at least one end of each of a plurality of light guiding strips if desired, and a light reflecting unit 18 is disposed between two neighboring light guiding strips 12.

As shown in FIG. 1C, the light guiding strip 12 includes a plurality of light emergent surfaces 122, 124 and 126, and a plurality of light reflecting surfaces 132, 134 and 136. In this embodiment, the cross section of the light guiding strip 12 is hexagonal, and each side of the hexagonal corresponds to a light emergent surface or a light reflecting surface. Light diffusion patterns, having a light diffusion function, are disposed on the light reflecting surfaces 132, 134 and 136. In this embodiment, the light diffusion patterns are a plurality of small bumps 138 with a diameter of about 0.05-0.4 mm, and preferably about 0.1-0.3 mm. Each of the light emergent surfaces 122, 124 and 126 has a smooth surface, which will reflect the light at specific angles and refract most of the light coming from the light diffusion patterns. As the small bumps 138 which form the light diffusion patterns will break the total reflection conditions, the light incident on the light guiding strip 12 from the LED 14 will be diffused, and the propagating direction of the light will be changed. Therefore, these small bumps 138 allow the light to be refracted and come out from the light emergent surfaces 122, 124 and 126 more easily with a certain energy distribution, so as to improve the light emitting efficiency and uniformity of the light guiding strip 12.

While the above embodiment is illustrated by way of a light guiding strip with a cross section of a hexagonal, persons of ordinary skill in the art that can easily derive the fact that the cross section of the light guiding strip of other preferred embodiments of the present invention can be a polygon with four or more sides, for example, an octagon. Furthermore, if the cross section of the light guiding strip has N sides, then the light guiding strip has N/2 light emergent surfaces arranged in a cluster and N/2 light reflecting surfaces arranged in a cluster.

Figure 2B:
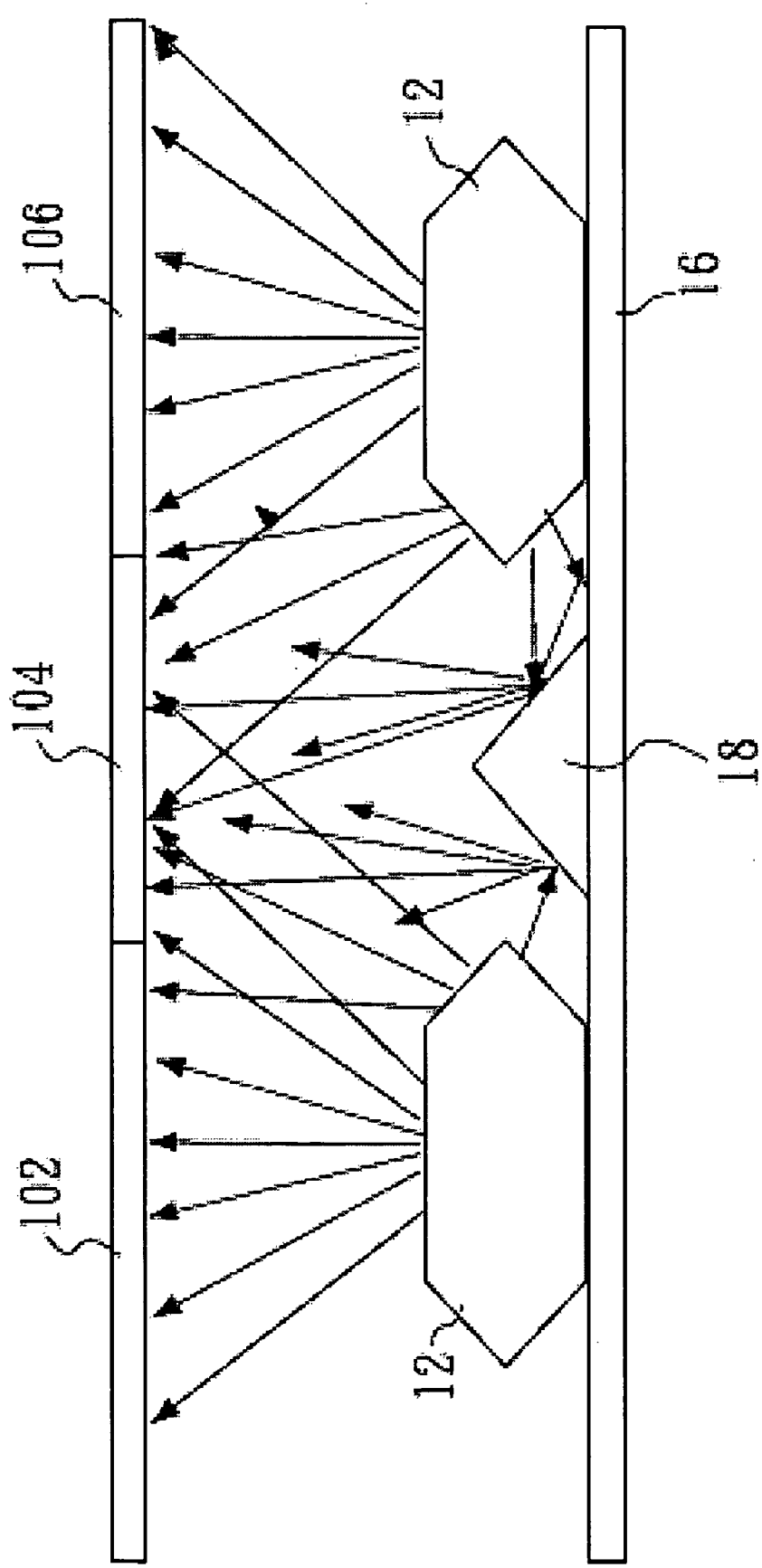
FIG. 2B is a schematic view of the light output of an illumination module with the light reflecting units.

With reference to FIG. 2A and FIG. 2B, FIG. 2A is a schematic view of the light output of an illumination module without a light reflecting unit, and FIG. 2B is a schematic view of the light output of an illumination module with the light reflecting units. As shown in FIG. 2A, the areas 102 and 106 above the light guiding strips 12 of the illumination modules, are closer to the light guiding strips 12 and may receive more light, whereas the area 104 is further from the light guiding strips 12, the light emitted from the side edges of the light guiding strips 12 partially could not reach the area 104 at all. Therefore, the areas 102 and 106 is brighter than area 104, so that the overall light of the illumination module is not uniform. As shown in FIG. 2B, if the light reflecting unit 18 is disposed between the light guiding strips, most of the light emitted from the side edges of light guiding strips or the light propagating toward the substrate 16 is reflected to area 104 via light reflecting unit 18 so as to increase the brightness of area 104. Therefore, the light output uniformity and efficiency of the illumination module can be improved.

Figure 3:
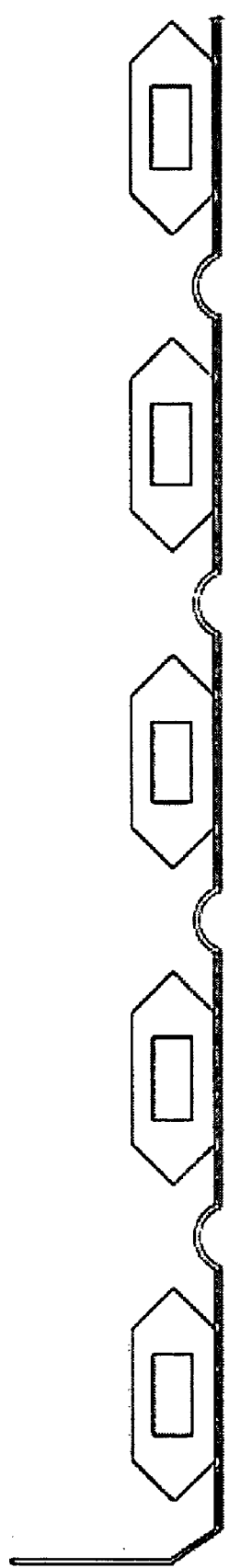
FIG. 3 is a cross sectional view of an illumination module according to another preferred embodiment of the present invention.
Figure 4:
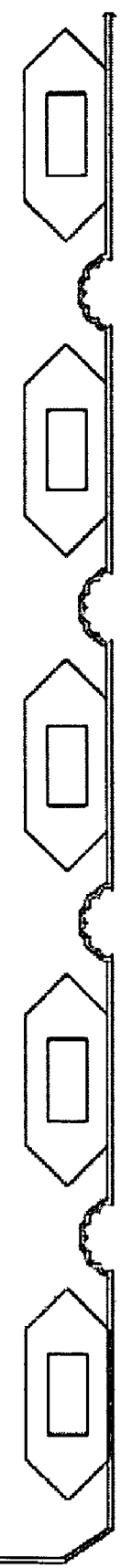
FIG. 4 is a cross sectional view of an illumination module according to another preferred embodiment of the present invention.
Figure 5:
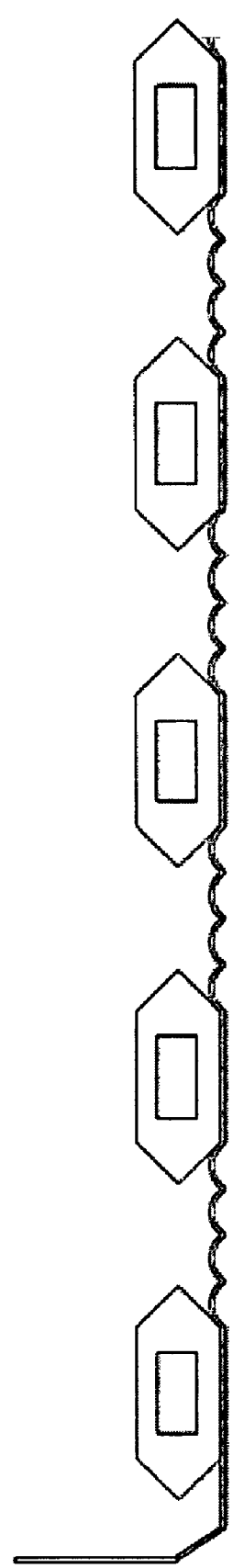
FIG. 5 is a cross sectional view of an illumination module according to another preferred embodiment of the present invention.
Figure 6:
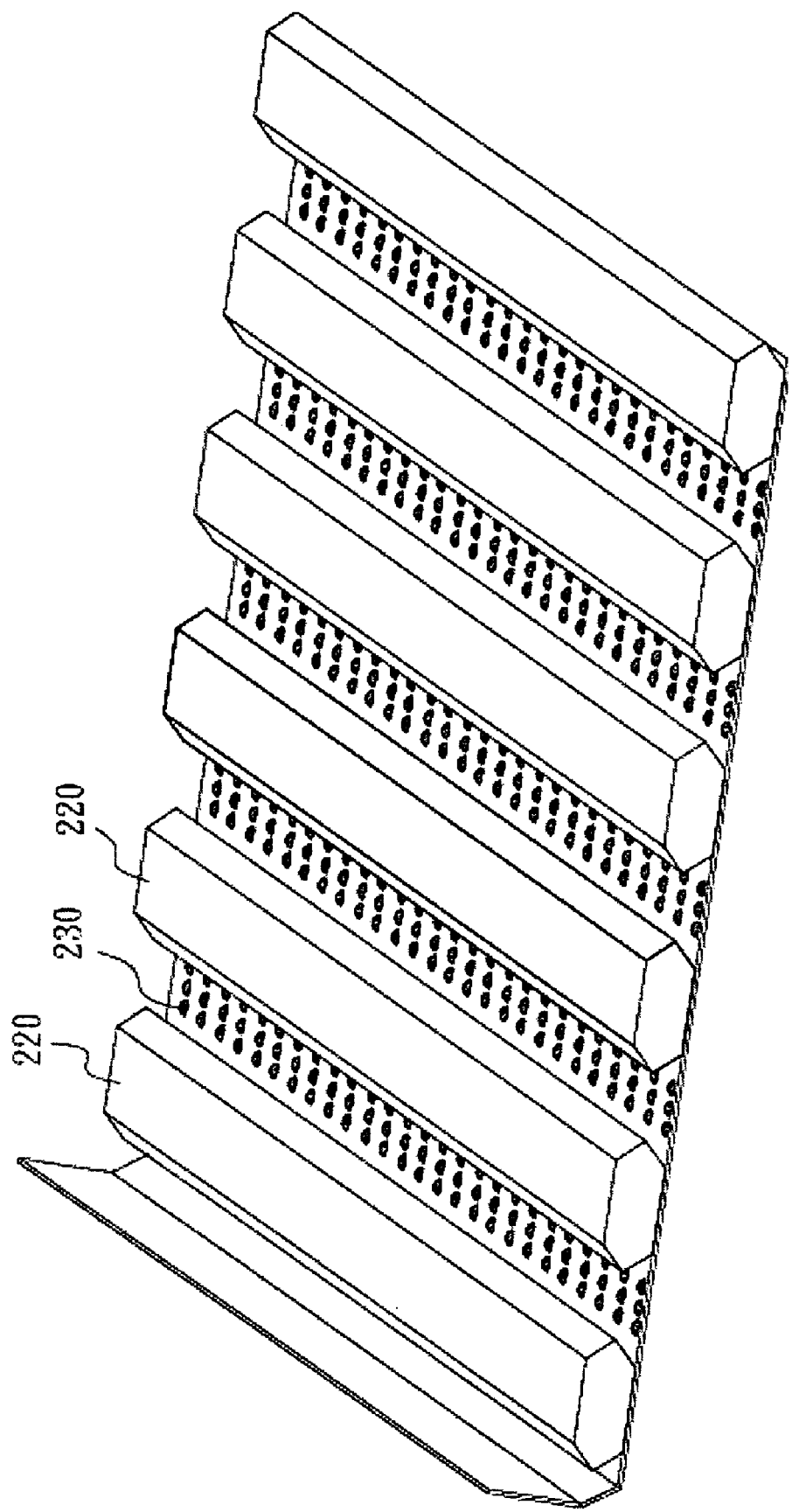
FIG. 6 is a schematic view of an illumination module according to another preferred embodiment of the present invention.

FIG. 3, FIG. 4 and FIG. 5 are other preferred embodiments of an illumination module according to the present invention. The shape of the light reflecting units used in the present invention is not limited to the types of the above embodiments. For example, the cross section of the light reflecting units can include triangle, arclike (as show in FIG. 3), a plurality of arcs (as show in FIG. 4 and FIG. 5) or other shapes. It should be noted that although the light reflecting units disclosed above are long strip-shaped and substantially parallel to the light guiding strips, but a plurality of granular light reflecting units disposed between two neighboring light guiding strips can also achieve the similar results. With reference to FIG. 6, there are a plurality of light reflecting units 230 between the light guiding strips 220, and the light reflecting units 230 can be conical shape, triangle pyramid, or hemispherical and the like. Most of the light emitted from the side edges of the light guiding strips or the light propagating toward the substrate can be reflected to the right side of the illumination module via the granular light reflecting units 230, so as to improve light output uniformity and efficiency of the illumination modules.

Furthermore, the material of the light reflecting units is the same as that of said substrate according to one of the preferred embodiments of the present invention, so that the light reflecting units can be molded together with said substrate in an injection molding or die-casting process. Based on the above embodiments of the present invention, it should be noted by those skilled in the art that the light reflecting units with long strip shape or granular shape or other kinds of geometry can achieve the similar results. Moreover, the method of forming the light reflecting units is also not limited to the above embodiments, for example, a light diffusion pattern formed on said substrate by a dot-printing process can also achieve the effect of the light reflecting units.

To sum up, the illumination module or display or general illumination apparatus using the illumination module according to the present invention at least have the following advantages. Firstly, as compared with the side-lit, the illumination module of the present invention does not need the light guide, so the weight of the illumination module or display using the illumination module is reduced. Secondly, the illumination module or display according to the present invention can be effectively increase the LED pitch, thus saving costs. Further, compared to the direct-lit type, the illumination module or display according to the present invention can reduce the thickness of the illumination module. Moreover, the illumination module, display and general light apparatus according to the present invention do not need the light guide and additional circuit boards, so the cost of the overall structure is reduced greatly. Finally, the light reflecting units disposed between the light guiding strips can further improve the light output uniformity and efficiency of the illumination module.

Although the technical contents and features of the present invention are described above, persons skilled in the art can make variations and modifications without departing from the teaching and disclosure of the present invention. Therefore, the scope of the present invention is not limited to those embodiments disclosed herein, but other variations and modifications without departing from the present invention should be included, and within the scope covered by the claims.

What is claimed is:
1. An illumination module, comprising:
    a plurality of light guiding strips, arranged in juxtaposition with a predefined distance;

a plurality of light sources, disposed on at least one end of said light guiding strips respectively, for providing the light into said light guiding strips; and a plurality of light reflecting units, disposed between said light guiding strips, for reflecting the light from said light guiding strips.

2. The illumination module of claim 1, wherein a cross section of said light guiding strips is a polygon with four or more sides.

3. The illumination module of claim 2, wherein said light guiding strip includes a plurality of light reflecting surfaces and a plurality of light emergent surfaces, each of said light reflecting surfaces has light diffusion patterns, and each of said light emergent surfaces is a smooth surface.

4. The illumination module of claim 2, wherein said light guiding strip includes a plurality of light reflecting surfaces and a plurality of light emergent surfaces, said light reflecting surfaces are arranged in a cluster, and said light emergent surfaces are also arranged in a cluster.

5. The illumination module of claim 1, wherein at least one light reflecting unit is disposed between two neighboring ones of said light guiding strips.

6. The illumination module of claim 5, wherein said light reflecting unit is long strip-shaped, and disposed substantially parallel to said light guiding strips.

7. The illumination module of claim 6, wherein a cross section of said light reflecting units is selected from the list consisting of: triangle, arclike, and a plurality of arcs.

8. The illumination module of claim 1, wherein a plurality of light reflecting units are disposed between two neighboring ones of said light guiding strips.

9. The illumination module of claim 8, wherein said light reflecting units are granular.

10. The illumination module of claim 8, wherein said light reflecting unit's shape is selected from the list consisting of: conical shape, triangle pyramid and hemispherical.

11. The illumination module of claim 1, wherein said light reflecting units are light diffusion patterns.

12. The illumination module of claim 11, wherein said light diffusion patterns is formed on a substrate by a dot-printing process.

13. The illumination module of claim 1, wherein the material of said light reflecting units is the same as that of a substrate.

14. The illumination module of claim 13, wherein said light reflecting units are molded together with said substrate by an injection molding process.

15. The illumination module of claim 13, wherein said light reflecting units are molded together with said substrate by a die-casting process.

16. The illumination module of claim 1, wherein further comprising a plurality of light sources disposed on at least one end of said light guiding strips respectively, for providing the light into said light guiding strips.

17. A display, comprising said illumination modules as claimed in any one of claims 1-16.

18. A general lighting apparatus, comprising said illumination modules as claimed in any one of claims 1-16.

* * * * *